United States Patent
Mangayil et al.

(10) Patent No.: US 11,570,183 B2
(45) Date of Patent: Jan. 31, 2023

(54) TENANT GROUPING FOR SECURE TRANSPORT OF CONTENT

(71) Applicant: SAP SE, Walldorf (DE)

(72) Inventors: Harikrishnan Mangayil, Bangalore (IN); Abhishek Nagendra, Bangalore (IN); Yash Bagadia, Bangalore (IN); Subhadeep Khan, Anandaur (IN); Jayant Sable, Bangalore (IN); Srinivas Vinnakota, Bangalore (IN); Sukesh Kaul, Ghaziabad (IN)

(73) Assignee: SAP SE, Walldorf (DE)

( * ) Notice: Subject to any disclaimer, the term of this patent is extended or adjusted under 35 U.S.C. 154(b) by 304 days.

(21) Appl. No.: 16/895,988

(22) Filed: Jun. 8, 2020

(65) Prior Publication Data
US 2021/0328998 A1   Oct. 21, 2021

(30) Foreign Application Priority Data
Apr. 15, 2020  (IN) .............. 202011016335

(51) Int. Cl.
*H04L 29/06* (2006.01)
*H04L 9/40* (2022.01)
*G06F 16/245* (2019.01)

(52) U.S. Cl.
CPC .......... *H04L 63/105* (2013.01); *G06F 16/245* (2019.01)

(58) Field of Classification Search
CPC .................................................. H04L 63/105
See application file for complete search history.

(56) References Cited

U.S. PATENT DOCUMENTS

| | | | |
|---|---|---|---|
| 9,369,489 B2 * | 6/2016 | Kato | H04L 63/20 |
| 2008/0033916 A1 * | 2/2008 | Ray | G06F 21/10 |
| 2009/0288084 A1 * | 11/2009 | Astete | G06Q 30/0603 |
| | | | 718/1 |

(Continued)

OTHER PUBLICATIONS

Related U.S. Patent Application entitled "Analytics Content Network For Content Delivery Embedding", filed Dec. 19, 2019, 49 pages.

(Continued)

*Primary Examiner* — Fahmida S Chowdhury
(74) *Attorney, Agent, or Firm* — Fountainhead Law Group P.C.

(57) ABSTRACT

A distribution network communicates content to tenant groups in a secure manner. An engine of the distribution network receives content created utilizing an application having different customers and partners. The engine also receives: a first identifier indicating a customer of the application with which a tenant is associated, and a second identifier indicating a partner of the application with which the tenant is associated. The engine references a stored database table to correlate the first identifier and the second identifier. Based upon the first identifier and the second identifier, the engine evaluates whether the tenant is to be provided access to the content. The engine may provide the tenant with the content according to an access right determined from the first identifier and the second identifier. Certain embodiments may find particular use disseminating content to new tenants of a customer, based upon prior distribution to other tenants of that customer.

20 Claims, 12 Drawing Sheets

| tenant_users_details | | |
|---|---|---|
| user_details_id | SERIAL8 | <pk> |
| tenant_landscape | VARCHAR(255) | <ak,fk> |
| tenant_uuid | VARCHAR(255) | <ak> |
| user_id | VARCHAR(255) | <ak> |
| user_name | VARCHAR(255) | |
| oem_id | VARCHAR(100) | <ak> |
| erp_number | VARCHAR(100) | <ak> |
| extended_col1 | VARCHAR | |
| extended_col2 | INT8 | |

(56) References Cited

U.S. PATENT DOCUMENTS

| | | | | |
|---|---|---|---|---|
| 2010/0070323 | A1* | 3/2010 | Polcari | G06Q 10/1095 |
| | | | | 705/7.19 |
| 2012/0072716 | A1* | 3/2012 | Hu | G06F 21/602 |
| | | | | 713/189 |
| 2012/0159423 | A1* | 6/2012 | Becker | G06F 9/44526 |
| | | | | 717/102 |
| 2012/0179601 | A1* | 7/2012 | Johns | G06Q 20/10 |
| | | | | 705/35 |
| 2012/0179608 | A1* | 7/2012 | Johns | G06Q 20/108 |
| | | | | 705/42 |
| 2014/0298483 | A1* | 10/2014 | Kato | H04L 63/10 |
| | | | | 726/27 |
| 2015/0319103 | A1* | 11/2015 | Das | H04L 67/10 |
| | | | | 709/225 |
| 2016/0335414 | A1* | 11/2016 | Isaacs | G16H 40/40 |
| 2016/0350153 | A1* | 12/2016 | Khot | G06F 9/4881 |
| 2017/0155672 | A1* | 6/2017 | Muthukrishnan | H04L 67/02 |
| 2019/0146840 | A1* | 5/2019 | Helms | G06F 9/5011 |
| | | | | 718/104 |
| 2019/0236606 | A1* | 8/2019 | Padmanabhan | H04L 9/3239 |
| 2019/0238525 | A1* | 8/2019 | Padmanabhan | H04L 9/3236 |
| 2019/0278631 | A1* | 9/2019 | Guim Bernat | G06F 9/542 |
| 2019/0342159 | A1* | 11/2019 | Witko | H04L 41/0806 |
| 2019/0349198 | A1* | 11/2019 | Patel | H04L 9/3215 |
| 2020/0134656 | A1* | 4/2020 | Padmanabhan | H04L 9/0637 |
| 2021/0216190 | A1* | 7/2021 | Vakil | G06F 16/953 |

OTHER PUBLICATIONS

U.S. Patent Application entitled "Assigning Access Control for Flat Data Structure" U.S. Appl. No. 16/867,304, filed May 5, 2020, 50 pages.

U.S. Patent Application entitled "File-Based Sharing Using Content Distributions Network" U.S. Appl. No. 16/883,754, filed May 26, 2020, 31 pages.

* cited by examiner

| private_items | | |
|---|---|---|
| <u>item_id</u> | <u>SERIAL8</u> | <u>\<pk\></u> |
| owner_details_id | INT8 | \<fk3\> |
| state_name | VARCHAR(20) | \<fk1\> |
| item_type | VARCHAR(20) | \<fk2\> |
| parent | INT8 | \<fk4\> |
| allow_subscriptions | BOOL | |
| license_tag_name | VARCHAR(255) | |
| created | TIMESTAMP | |
| last_updated | TIMESTAMP | |
| last_updated_by | INT8 | |
| marked_for_deletion | BOOL | |
| extended_col1 | VARCHAR | |
| extended_col2 | INT8 | |

FIG. 6A

| tenant_users_details | | |
|---|---|---|
| <u>user_details_id</u> | <u>SERIAL8</u> | <u>\<pk\></u> |
| tenant_landscape | VARCHAR(255) | \<ak,fk\> |
| tenant_uuid | VARCHAR(255) | \<ak\> |
| user_id | VARCHAR(255) | \<ak\> |
| user_name | VARCHAR(255) | |
| oem_id | VARCHAR(100) | \<ak\> |
| erp_number | VARCHAR(100) | \<ak\> |
| extended_col1 | VARCHAR | |
| extended_col2 | INT8 | |

FIG. 6B permissions

| | |
|---|---|
| item_id | INT8 <pk, fk1> |
| wave_item_id | INT8 <fk2> |
| access_given_to_user_id | INT8 <pk, fk3> |
| access_given_by_user_id | INT8 <fk4> |
| access_given_on | TIMESTAMP |
| read | BOOL |
| write | BOOL |
| grant_access | BOOL |
| change_owner | BOOL |
| delete | BOOL |
| list | BOOL |
| last_updated | TIMESTAMP |
| last_updated_by | INT8 |
| expires | TIMESTAMP |
| marked_for_deletion | BOOL |
| extended_col1 | VARCHAR |
| extended_col2 | INT8 |
| extended_col3 | BOOL |
| extended_col4 | BOOL |

FIG. 6C

| item_id | INT8 |
|---|---|
| wave_item_id | INT8 |
| user_details_id | INT8 |
| wave_version | VARCHAR(50) |
| completion_time | TIMESTAMP |
| was_sucessful | BOOL |
| extended_col1 | VARCHAR |

FIG. 6E private_wave_items

| | |
|---|---|
| wave_item_id | SERIAL8 <pk> |
| item_id | INT8 <fk1> |
| wave_item_owner_details_id | INT8 <fk3> |
| wave_version | VARCHAR(50) |
| state_name | VARCHAR(20) <fk2> |

FIG. 6D

TENANT GROUPING FOR SECURE TRANSPORT OF CONTENT

CROSS-REFERENCE TO RELATED APPLICATION

The instant US Nonprovisional Patent application claims priority to Indian Provisional Patent Application No. 202011016335, filed Apr. 15, 2020 and incorporated by reference in its entirety herein for all purposes.

BACKGROUND

Unless otherwise indicated herein, the approaches described in this section are not prior art to the claims in this application and are not admitted to be prior art by inclusion in this section.

Software systems permit enterprises to generate and accumulate volumes of data such as product data, financial data, human resources (HR) data, and the like. To aid the enterprise in gleaning meaningful insights from the mass of data, intelligent analytics systems have been developed. These analytics systems afford insights—statistics, facts, trends, and the like determined from the enterprise data. Example insights include, e.g., highest rated product, revenue, margin, actual sales, forecast sales, and the like. Specific types of analytic content can comprise dashboards, Key Performance Indicator (KPI) definitions, and planning scenarios.

Various entities can generate analytic content. For example, a service provider may provide the analytics system. Other entities that generate analytic content can include but are not limited to third-party developers, and OEMs. A service provider offering the analytics system can provide one or more dashboards as analytics content, which a customer using the analytics system access enterprise data and insights. Thus, best-of-breed analytics content can be provided, and each customer is not required to create their own analytics content.

A distribution network may be used to communicate content from the analytics system to various consumers, such as individual customers and tenants. In the cloud world, with tenants being distributed across the globe in different data centers, a challenge is securely sharing this content as soon as these tenants are created. For example, when a partner wishes to create some standard content and share it with customer(s) throughout the world as soon as the customer gets a new tenant, it can be difficult to ensure that the new customer tenant has immediate access to the content, and access to only that content intended for the new customer. Similar needs arise in controlling secure transport of content between various tenants.

SUMMARY

Embodiments provide a mechanism allowing a distribution network to communicate content to tenant groups in a secure manner. An engine of the distribution network receives content created utilizing an application having different customers and partners. The engine also receives: a first identifier indicating a customer of the application with which a tenant is associated, and a second identifier indicating a partner of the application with which the tenant is associated. The engine references a database table stored in a database to correlate the first identifier and the second identifier with a tenant. Based upon the first and second identifier, the engine evaluates whether the tenant is to be provided access to the content.

If content access is to be provided, the engine may make the content (e.g., package) visible on the tenant. Specifically, using the tenant's customer and partner IDs, the distribution network checks to see what context packages are shared with those IDs (customer Id, partner Id or tenant URL), and makes those content packages visible on the tenant. Specific embodiments may be particularly suited to automatically disseminating content to newly added tenants of an existing customer, based upon prior distribution of content to other tenants of that existing customer.

In some embodiments, a particular access level can be extended to a tenant based upon additional permissions. That is, content may be afforded to the tenant with an access right privilege level (e.g., View, Import, Edit, Delete) that is determined from the first identifier and from the second identifier.

The following detailed description and accompanying drawings provide a better understanding of the nature and advantages of various embodiments.

BRIEF DESCRIPTION OF THE DRAWINGS

FIGS. 6A-E show details of various components of that database schema.

DETAILED DESCRIPTION

Described herein are methods and apparatuses that implement tenant grouping for secure sharing of content. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
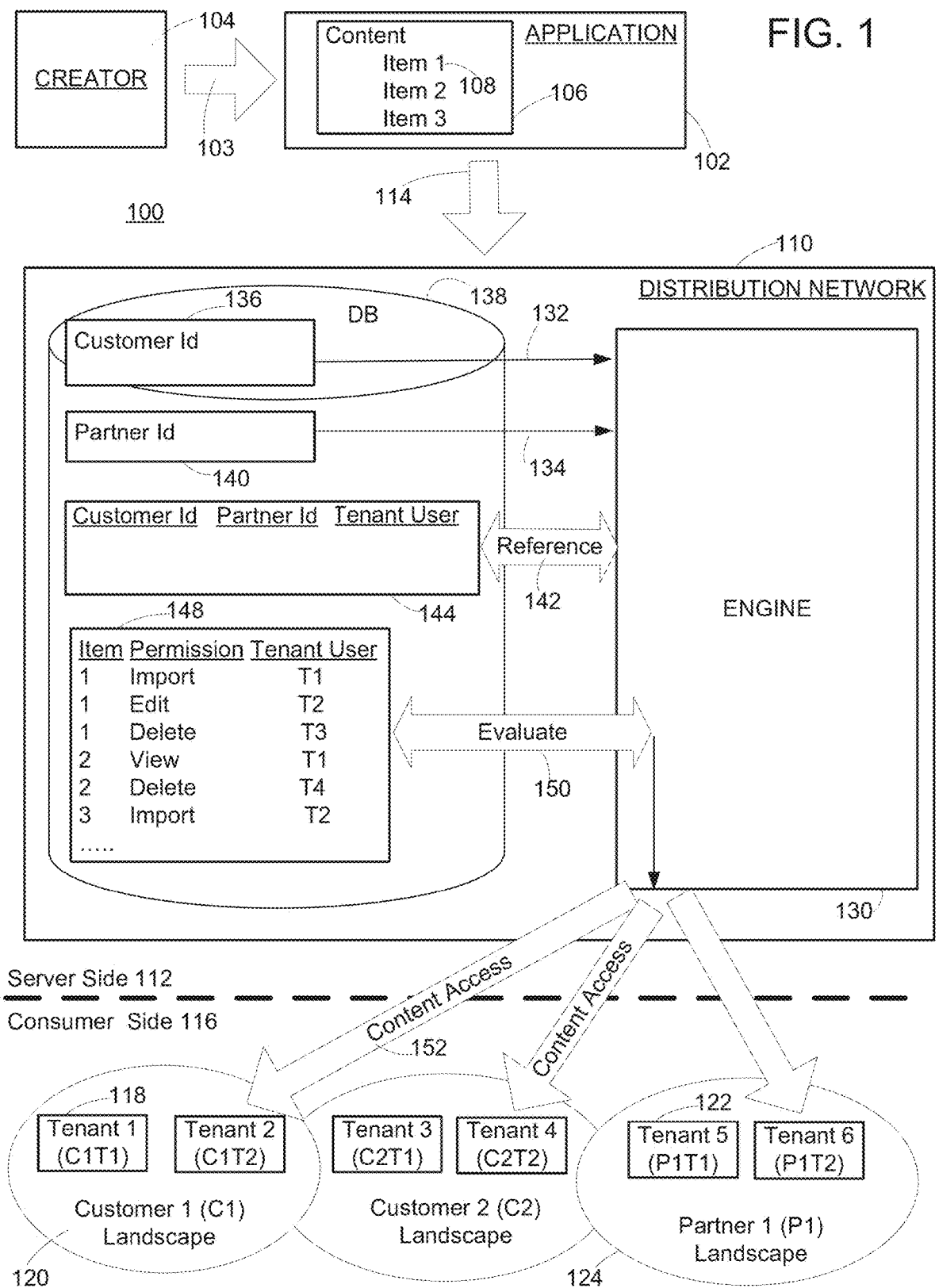
FIG. 1 shows a simplified diagram of a system according to an embodiment.

FIG. 1 shows a simplified view of an example system that is configured to implement tenant grouping according to an embodiment. Specifically, system 100 comprises application 102 that is accessed 103 by creator 104 in order to create content 106, including item(s) 108, such as dimensions, stories, views, etc.

The application is in communication with distribution network 110 (typically located on a server side 112) to disseminate 114 content to different entities located on a consumer side 116. Such entities may comprise tenant(s) 118 residing within a particular customer landscape 120, and tenant(s) 122 residing within a partner landscape 124.

To accomplish content distribution in a secure and efficient manner, embodiments provide an engine 130. Engine 130 is configured to receive inputs 132 and 134.

Input 132 comprises a first identifier 136 that is stored within a database 138. This first (e.g., partner) identifier allows grouping together of partners. Every time a new tenant is provisioned for a partner in any of the landscapes/datacenters around the world, that tenant is assigned the same first identifier. That first identifier allows the tenant to be associated as part of a cluster of tenants belonging to the same partner.

Input 134 comprises a second identifier 140 that is also stored within database 138. This second (e.g., customer) identifier allows grouping together of customers. In particular, each customer procuring licenses of the application is assigned the second unique identifier. Every tenant provisioned for any customer is also labelled with this unique second identifier. This functions to create a grouping of all tenants belonging to a particular customer, regardless of the particular datacenter/landscape in which the tenant is provisioned.

Using the two identifiers introduced above for grouping tenants of the application, the distribution network offers a secure implementation that allows content to be shared from a tenant to any other individual tenant (direct tenant sharing), a partner (first ID grouped sharing) or a customer (second ID grouped sharing).

As illustrated in FIG. 1, group level sharing as well as an internal access control mechanism may be handled via database tables of the distribution network. In particular, the engine references 142 database table 144 that correlates the first identifier and the second identifier to a particular tenant user 146.

Then, this tenant user information can be used by the engine to control distribution of the content amongst various tenants. For example, the engine can interact with permissions entry table 148 to determine the nature of the access right being afforded to the tenant recipient of the content.

Examples of such levels of such access rights can include but are not limited to (listed below in order of increasing power):

View access: the recipient is apprised of the existence of the content;
Import access: the recipient may download the content;
Edit access: the recipient may modify the content;
Delete access: the recipient may remove the content entirely.

In order to ensure access to any tenant of a customer or partner, the engine evaluates 150 the tenant itself (using a tenant ID) to which analytic content has been shared, or whether the tenant has a set customer or partner ID to which the analytic content has been shared.

Using this approach, if/when a new tenant is provisioned with the partner and customer IDs, content previously shared directly with these partners and customers now becomes accessible 152 to the new tenant, at the specified level of access right. There is no need for partners, customers, or any other user to re-share that previously distributed content.

Figure 4:
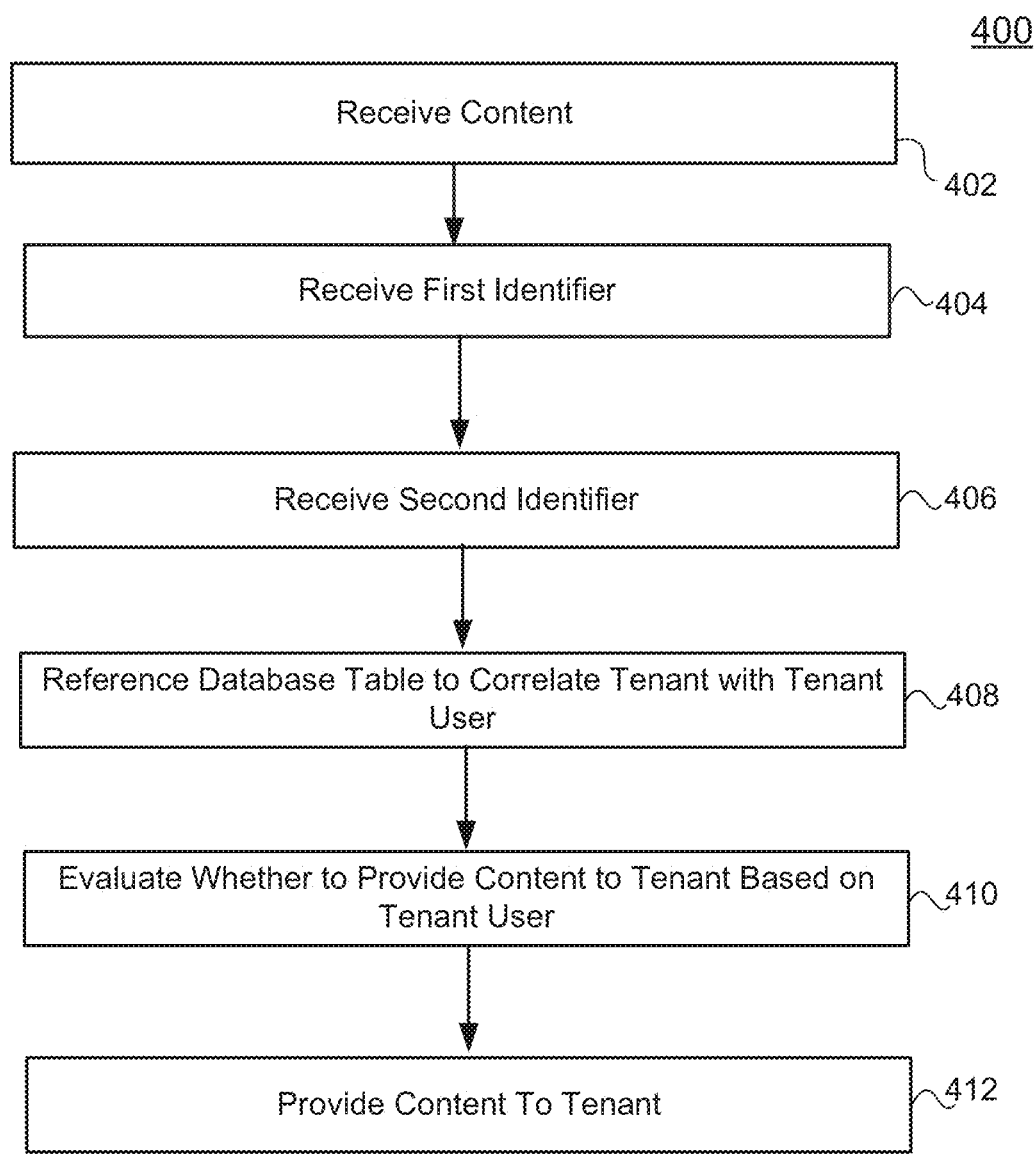
FIG. 4 shows a simplified flow diagram of a method according to an embodiment.

FIG. 4 is a flow diagram of a method 400 according to an embodiment. At 402, content created utilizing an application is received.

At 404, a first identifier indicating a customer of the application with which a tenant is associated, is received. At 406, a second identifier indicating a partner of the application with which the tenant is associated, is received.

At 408, a database table stored in a database is referenced to correlate the first identifier and the second identifier with a tenant user. At 410, whether the tenant is to be provided access to the content based upon the tenant user, is evaluated. At 412, the content is provided to the user.

Further details regarding tenant grouping according to embodiments, are now described in connection with the following examples. In particular, the SAP Analytics Cloud (SAC) is an analytical tool encompassing planning, business intelligence, and predictive capabilities.

Example 1

Analytical content created may need to be shared across to other tenants belonging to a same partner, customer, or to the partners' customer. Such sharing is achieved utilizing the Analytics Content Network (ACN) feature of SAC.

Traditionally, a file-based approach may be implemented to provide analytics content to consumers. Under a file-based approach, analytics content is down- and up-loaded to files (e.g., .tgz files (GZIP Compressed Tar Archive files)). However, analytics content has to be provisioned to tenants (e.g., executing an application, in which the analytics content is to be provided). If the analytics content is developed and owned by the service provider (here SAP SE) or by third-parties (e.g., partners of the enterprise), the analytics content has to be shipped together with the SAC application and has to be installed at the point in time when the tenants are upgraded to a respective release of the application.

In order to impart flexibility for content distribution, SAC further includes the ACN feature. In particular, ACN is one of SAC's important infrastructure components. ACN resides in SAC landscapes as a central component, connecting those landscapes.

Logically, ACN can be understood as a single global content network which can provision or share any SAC content. As ACN is connected out-of-the-box to any SAC tenant, it can provision and share content into any SAC tenant.

A server system can host one or more cloud-based systems (e.g., SAP Analytics Cloud, SAP Analytics Hub). In some implementations, a cloud-based system further includes an ACN that is used to provision analytics content to one or more applications.

For example, a customer (e.g., an enterprise) can use an application (e.g., SAP SuccessFactors) in a tenant-based scenario, which includes provisioning of the application for a customer within an application tenant that is specific to the customer. Further, and in accordance with particular embodiments, the application can include an analytics system (e.g., SAC) embedded therein. For example, the analytics system can be provided in an analytics system tenant that is embedded in the application tenant.

As introduced above, specific embodiments are directed to an ACN that permits distribution of analytics content for applications having an analytics system embedded therein. More particularly and as described in further detail herein, analytics content is provisioned from the ACN for use with analytics functionality provided by an analytics system that is embedded within an application.

That is, for example, the ACN supports import and export of analytics content to and from resources (e.g., cloud-based resources). For example, the analytics system providing analytics functionality within an application can include a UI (e.g., a "Content Library" UI) that enables a user (e.g., an agent of a customer) to access analytics content from the ACN.

Figure 2:
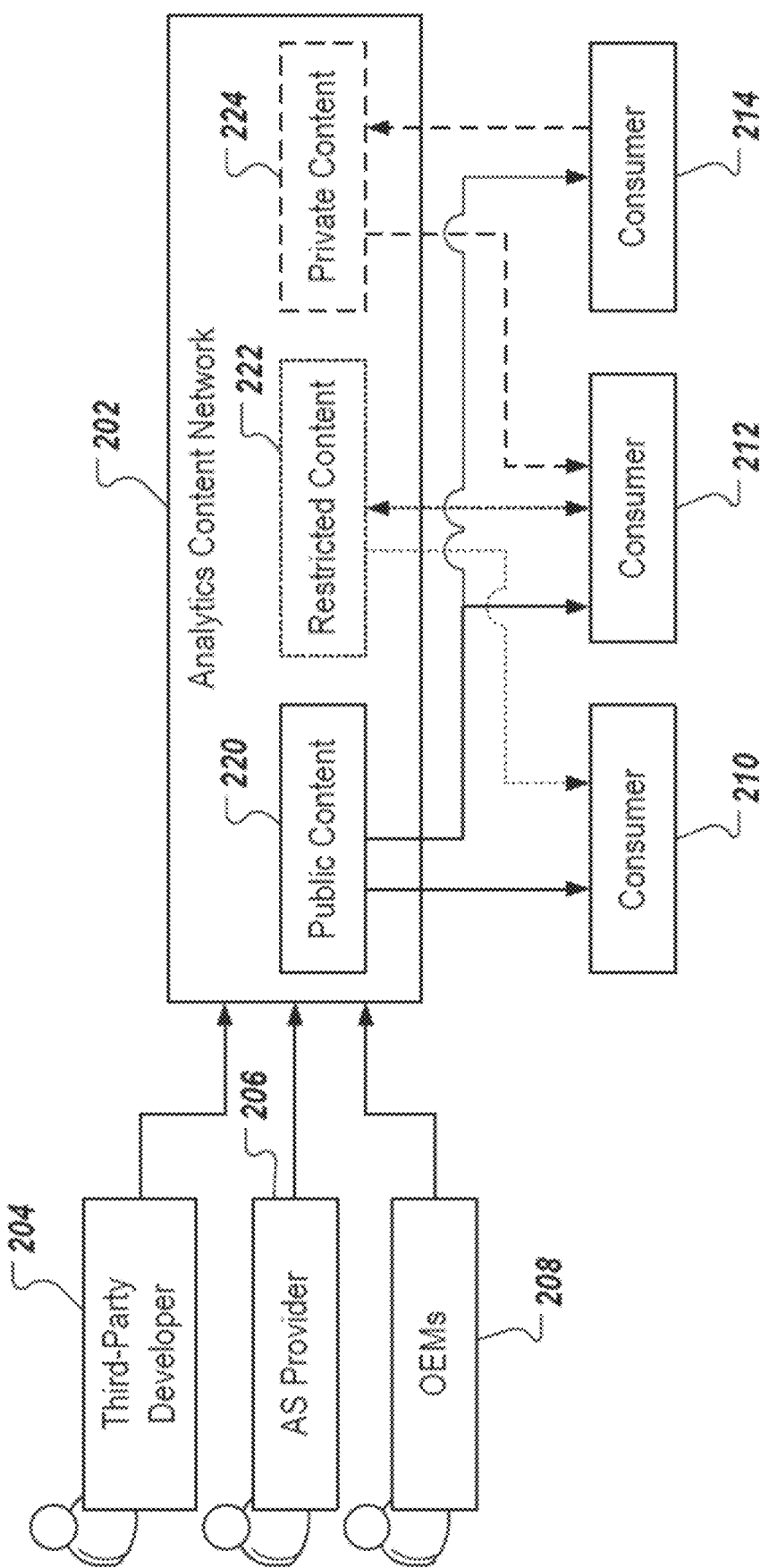
FIG. 2 depicts an example conceptual architecture in accordance with implementations of the present disclosure.

FIG. 2 depicts an example conceptual architecture 200 in accordance with implementations of the present disclosure. In the depicted example, the example conceptual architecture 200 includes an ACN 202, analytics content creators 204, 206, 208, and analytics content consumers 210, 212, 214. The ACN 202 includes a public analytics content store 220, a restricted analytics content store 222, and a private analytics content store 224. In some examples, one or more of the analytics content creators 204, 206, 208 provide analytics content that is published to the ACN 202. Example analytics content sources can include, without limitation, a third-party developer (analytics content source 204), an analytics system provider (analytics content source 206) (e.g., SAP SE, which provides SAC), and an OEM (analytics content source 208). In some examples, an OEM can include an enterprise that provides an application, within which the analytics system is embedded. For example, an OEM can include SAP SE, which provides SAP SuccessFactors, within which SAC can be embedded. In some examples, another OEM can provide their own proprietary application, within which SAC can be embedded.

In general, the analytics content creators create one or more types of analytics content. Example analytic content can include, without limitation, stories, models, dimensions, connections, Value-Driver Trees (VDT), dashboards, KPI definitions, and planning scenarios. If authorized, a content creator can export their analytics content to the ACN 202 by creating a content package, which contains one or more items of analytics content. In some examples, content is created using an analytics system tenant and is exported to the ACN 202. For a pre-defined content scenario (e.g., content provided by the AS provider 206), content is created using an internal analytics system tenant, is exported to the ACN 202, and is available to all analytics system tenants. In some examples, an analytics content administrator can view all available content packages. If authorized, one or more content packages can be imported from the ACN into one or more analytics system tenants. Thus, the analytics content is available for use in the respective analytics system tenants.

Example use cases for analytics content can include template content, demo content, and so-called "out-of-the-box" usable content. In some examples, template content includes analytics content that can be populated (e.g., with enterprise data, visualizations, analytical data), and can be modified by users. In some examples, demo content can be described as a lighter variant of template content, which typically comes with demo data (e.g., demo enterprise data) in the content package. In this manner, the analytics content can be demoed within the analytics system tenant immediately using the demo data, but is not usable in a production scenario. In this manner, a user can test the analytics content before importing a production-usable version of the analytics content. In some examples, the "out-of-the-box" usable analytics content is delivered together with applications which "fit" to the analytical content, and which keep its data actual.

In further detail, creation of analytics content can be described as a development task. For example, a developer (e.g., computer programmer) develops the analytics content in computer-executable code. For example, a dashboard is programmatically defined and is stored in one or more files (e.g., content packages). When ready for consumption (e.g., after final review, testing) the analytics content is exported to the ACN 202 (e.g., the developer manually exports content packages).

In some implementations, the analytics content consumers 210, 212, 214 represent one or more enterprises (customers) that consume applications and analytics systems provided by the service provider 206 (e.g., SAP SE). In some examples, the analytics content consumers 210, 212, 214 each represent one or more application tenants each embedded with an analytics system tenant, as described herein. In accordance with implementations of the present disclosure, each of the analytics content consumers 210, 212, 214 receives analytics content from the ACN 202. For example, the analytics system tenant of each of the analytics content consumers 210, 212, 214 receives analytics content from the ACN 202. Although not depicted in FIG. 2, but as described in further detail herein, the analytics content is received from the ACN 202 through one or more application programming interfaces (APIs).

In the particular example shown in FIG. 2, each of the analytics content consumers 210, 212, 214 receives the public analytics content from the public analytics content store 220. For example, the public analytics content can include a dashboard provided by the service provider (e.g., SAP SE), the dashboard being made available to all consumers of an application (e.g., SAP SuccessFactors) having analytics embedded therein. In some examples, the public analytics content is provided on a pull basis. That is, for example, to receive the public analytics content, a consumer sends a call for the public analytics content to the ACN 202 (e.g., through an API).

In the example of FIG. 2, the consumer 210 and the consumer 212 each receive the restricted analytics content from the restricted analytics content store 222. In some examples, the restricted analytics content is restricted to particular consumers. For example, an OEM can restrict the restricted analytics content to its customers. In some examples, the restricted analytics content is provided on a pull basis and/or a push basis. For example, in a pull basis, to receive the restricted analytics content, a consumer sends a call for the restricted analytics content to the ACN 202 (e.g., through an API). As another example, in a push basis, the restricted analytics content is automatically sent to the consumers 210, 212. For example, the restricted analytics content can be automatically sent in response to an update of the restricted analytics content.

In the example of FIG. 2, the consumer 212 receives private analytics content from the private analytics content store 224 and the consumer 214 provides private analytics content to the private analytics content store 222. In some examples, each consumer can create their own analytics content as private analytics content, and can transport the private analytics content from one of their analytics system tenants to another one of their analytics system tenants. In the example of FIG. 2, the consumer 214 can be a first analytics system tenant of an enterprise and the consumer 212 can be a second analytics system tenant of the enterprise, the consumer 214 transporting private analytics content to the consumer 212 through the ACN 202.

Figure 3:
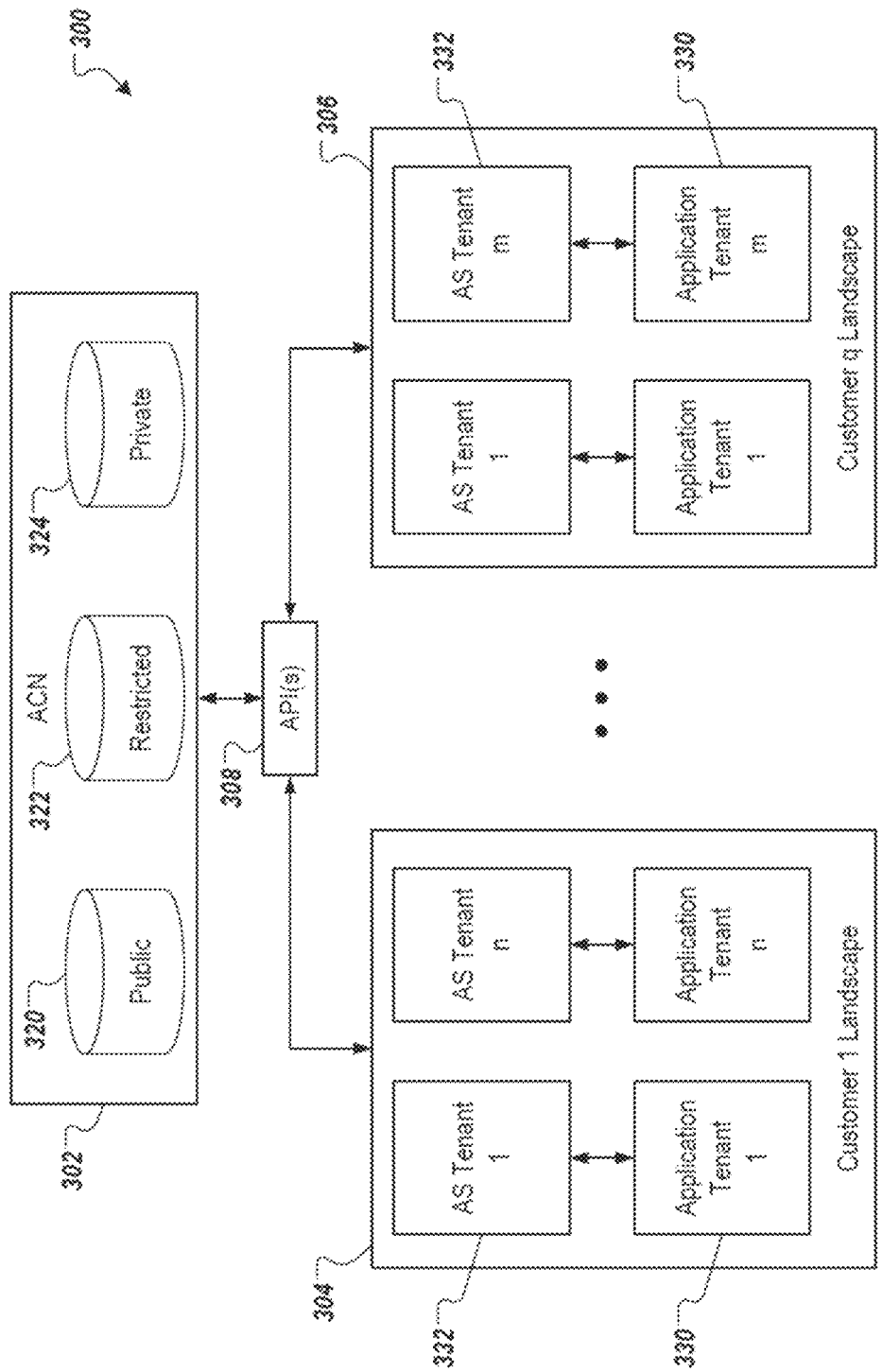
FIG. 3 depicts an example architecture in accordance with implementations of the present disclosure.

FIG. 3 depicts an example architecture 300. Here, the example architecture 300 includes an ACN 302, customer landscapes 304, 306, and one or more APIs 308 (e.g., REST APIs), through which the ACN 302 communicates with each of the customer landscapes 304, 306. In the depicted example, each of the customer landscapes 304, 306 includes one or more applications tenants 330 and respective analytics system tenants 332. In accordance with implementations of the present disclosure, and as described herein, each application tenant 330 is embedded with a respective analytics system tenant 332, which receives analytics content from the ACN 302. The ACN 302 includes a public analytics content store 320, a restricted analytics content store 322, and a private analytics content store 324, as similarly described above with reference to FIG. 2.

In accordance with implementations of the present disclosure, delivery of analytics content from the ACN 302 to one or more of the analytics system tenants 332 is automatically executed. For example, at provisioning of an analytics system tenant 332, analytics content that is relevant to the particular analytics system tenant 332 and/or customer is provided from the ACN 302. Automated provisioning of the analytics content enables time- and resource-efficient distribution of the analytics content, particularly in the case of 10s, 100s, or 1000s of tenants. In some examples, different tenants receive different analytics content. For example, an application tenant 330 of the customer landscape 304 can execute a first application (e.g., SAP SuccessFactors) that is embedded with the analytics system through the analytics system tenant 332 and receives first analytics content that is relevant to the first application (e.g., a HR dashboard for displaying analytical data, such as, recruitment KPI values, requisitions, positions, recruitment process analysis, and talent pipeline). As another example, an application tenant 330 of the customer landscape 306 can execute a second application (e.g., SAP CRM) that is embedded with the analytics system through the analytics system tenant 332, and receives second analytics content that is relevant to the second application (e.g., a CRM dashboard displaying analytical data, such as, growth, pipeline, sales team performance, target planning, and quota planning) In some examples, the analytics content that is to be sent to an analytics system tenant can be determined based on a universally unique identifier (UUID) that uniquely identifies the analytics system tenant among multiple analytics system tenants.

In some implementations, multiple types of analytics content delivery into tenants are provided, and can range from simple to advanced. Example types include, without limitation, manual analytics content delivery, automated-simple analytics content delivery (also referred to herein as light-embedding), and automated-advanced analytics content delivery (also referred to herein as deep-embedding).

In some examples, manual analytics content delivery refers to scenarios, in which a user (e.g., an agent/employee of a customer) of an application manually requests analytics content. For example, the user can open a content library using a UI of the application and can select one or more content packages. In response, a request is submitted to the ACN 302 through the API(s) 308 to import the analytics content and use the analytics content within the application. The manual analytics content delivery is typically used in case where an application has few tenants.

In some examples, in light-embedding, content packages are deployed through a tenant configuration API (TC-API), which is provided as one of the APIs 308. In some examples, the TC-API provides for tenant configuration. For example, upon initiation of an analytics system tenant, a call can be made through the TC-API for a configuration file that is used to configure the analytics system tenant: (e.g., https://api.analytics.system/oem//tenants/<AS_tenant uuid>/config).

For example, the call identifies a particular tenant using a UUID assigned to the tenant and requests computer-executable configuration instructions (config). In some examples, one of the configurations is "ACN content import" (e.g., "SetAcnPackage" in the API payload). In some examples, the particular analytics content can be determined based on the UUID of the tenant. For example, the UUID can be mapped to one or more analytics content, which is then provided in a content package to be included in the API payload sent in response to the configuration request. In this manner, the content package (containing the analytics content that is to be delivered to the analytics system tenant) is provided in the API payload that is transmitted to the analytics system tenant.

In some examples, authentication is provided using API keys. For example, each analytics system tenant includes an API key that is provided with the API call and authenticates the analytics system tenant for receipt of the content package(s). The API key can include an encrypted value that the API can use to authenticate the source of the API call (i.e., the tenant).

In some examples, in deep-embedding, content packages are deployed through a set of analytics system tenant content import/export APIs, which are provided in the APIs 308. In some examples, deep-embedding is used in scenarios where content packages are managed by respective development teams. For example, for some analytics content, creation is not a one-time task. Instead, the analytics content can undergo continuous or periodic development.

So-called hotfix processes are automatically executed to update the analytics content in respective tenants. By way of non-limiting example, a dashboard can be considered. An initial release of the dashboard can be provided as analytics content. However, the development team that provided the dashboard can revise (update) the dashboard. The updated dashboard can be released to the ACN 302 as analytics content, and the ACN 302 can distribute the updated dashboard to appropriate customers (e.g., all customers, if the dashboard is public; select customers, if the dashboard is restricted).

In some implementations, the APIs 308 include an export API and an import API that can be called based on uniform resource locators (URLs) of respective analytics system tenants (e.g., https://<AS_tenant URL>/api/v1/content/jobs) and which respectively enable for export/import of content packages. In some examples, import refers to downloading content from the ACN to an analytics system tenant, and export refers to uploading content to the ACN from an analytics system tenant. In some examples, the export API accepts a list of content items as input and can collect any dependent data objects to create a content package. By way of non-limiting example, in an api/v1/content/jobs endpoint, a type parameter is included and is set to EXPORT or IMPORT. During an export API call, identifiers assigned to respective content (e.g., stories, models) present in the current tenant (source tenant) are set to be exported. All of the content specified, and any dependencies, are exported to the ACN as a new package in a background job. During an import call, the content present inside an ACN package is imported into the target tenant.

In some examples, each of the import API and the export API operates asynchronously. For example, a first call triggers import/export and a "job id" is returned, which can be used to poll for the status of the import/export job. After some time (e.g., seconds, minutes), the job is finished and the analytics content is imported/exported. In some examples, authentication is provided using authentication clients. For example, the open authentication (OAuth) protocol can be used for the authentication process. In some examples, authentication is performed using OAuth clients and a client credentials flow. In some examples, OAuth clients are created locally to a tenant (e.g., as part of the configuration of the tenant using the TC-API, described above). Consequently, these APIs are typically called from an application tenant, which can connect to its associated analytics system tenant.

Turning now to the aspect of tenant grouping according to embodiments, the following table lists tenants of different partners (P) and customers (C).

| Partner/Customer Name | List of tenants |
|---|---|
| Partner1 (P1) | P1T1, P1T2, P1T3, P1T4 |
| Partner2 (P2) | P2T1, P2T2, P2T3, P2T4 |
| Customer1 (C1) | C1T1, C1T2, C1T3, C1T4 |
| Customer2 (C2) | C2T1, C2T2, C2T3, C2T4 |
| Customer3 (C3) | C3T1, C3T2, C3T3, C3T4 |

Figure 5:
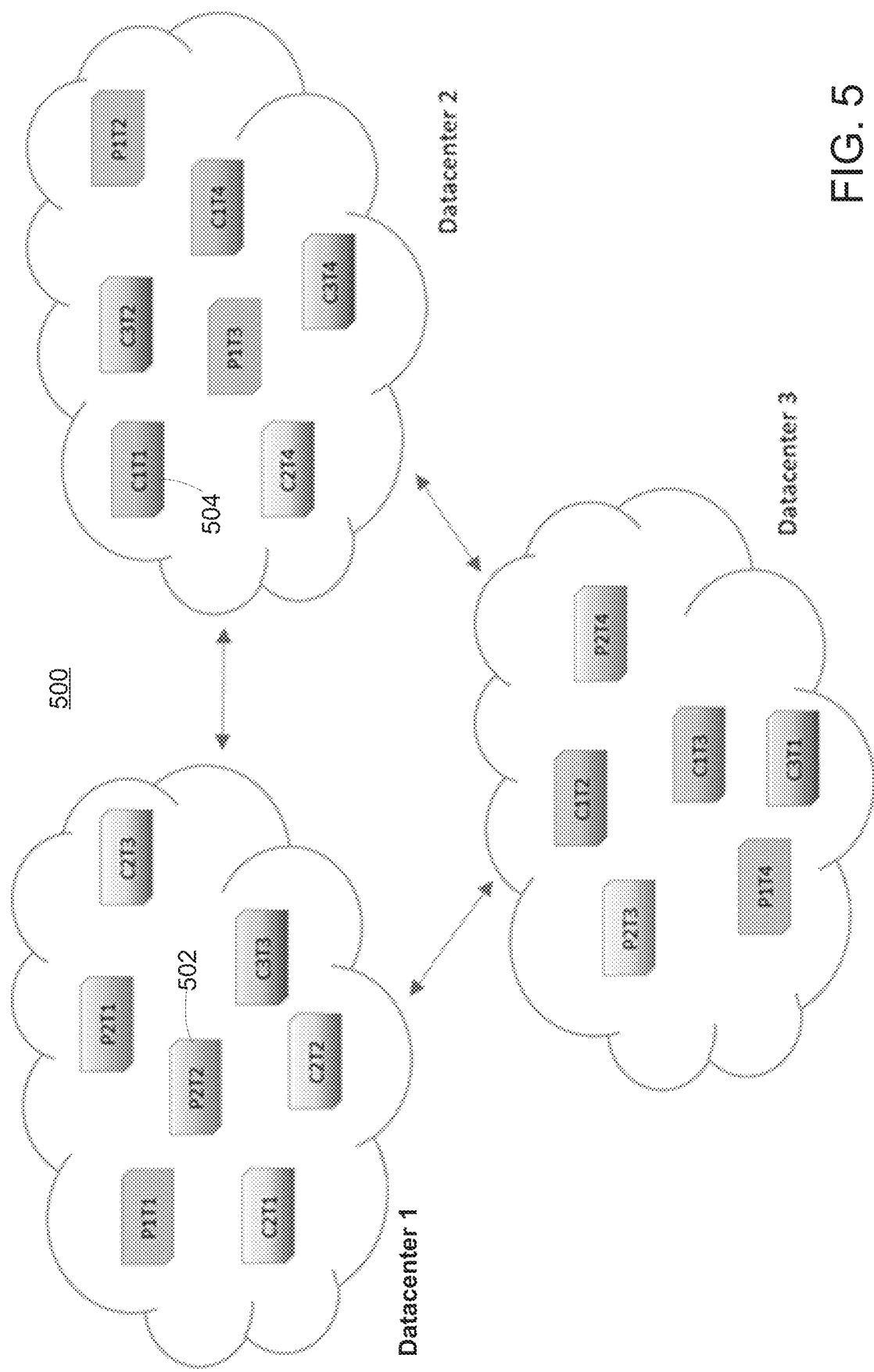
FIG. 5 is a simplified view showing distribution of tenants across different landscapes/datacenters located around the world.

The tenants listed above could potentially be distributed across different landscapes and/or datacenters that are located around the world. In particular, FIG. 5 illustrates a simplified view of Partner tenants 502 and Customer tenants 504 in a distributed cloud environment 500 comprising datacenters 1, 2, and 3.

Various possible use cases may be considered.

Use Case 1. Partner1 wants to share content with all tenants that it owns and allow all those tenants to edit the content shared.

Use Case 2. Partner1 wants to share content with all tenants owned by Partner2 and allow those tenants to only import content but not edit.

Use Case 3. Partner2 wants to share content with all tenants owned by Customer3 and only allow them to view the information on the content but not import it.

Use Case 4. Customer1 wants to share content with all tenants owned by Customer2 and allow all those tenants to edit and delete content.

Use Case 5. Customer2 wants to share content with customer1 and customer3 and allow all those customers to import the content but not edit.

Use Case 6 . . . . (other combinations)

When the list of tenants could be in the thousands for a given partner or customer, achieving the above use cases could be laborious if the content is to be shared with every tenant individually. Moreover, having these tenants located across different datacenters, increases the complexity in rapidly, efficiently, and accurately sharing the content.

Accordingly, in this specific example the grouping of tenants is accomplished in ACN as follows.

The Partner ID (OEM ID) This concept groups partners with an ID known internally as the OEM. Every time a new tenant is provisioned for a partner in any of the landscapes/datacenters around the world, that new tenant is assigned the same OEM ID that allows it to be identified as part of a cluster of tenants belonging to the same partner.

The Customer ID (ERP ID) Each SAP customer and its partner that procures licenses for SAC, is assigned a unique ID known as the ERP ID. Every tenant provisioned for any customer is also labelled with this unique ID. This creates a grouping of all tenants belonging to a particular customer regardless of the datacenter/landscape that they are provisioned in.

Using the OEM and ERP IDs described above, embodiments allow ACN to provide a secure sharing implementation, where content can be shared from a particular tenant to:

any other individual tenant (direct tenant sharing),
a partner (OEM ID grouped sharing), or
a customer (ERP ID grouped sharing).

Figure 6:
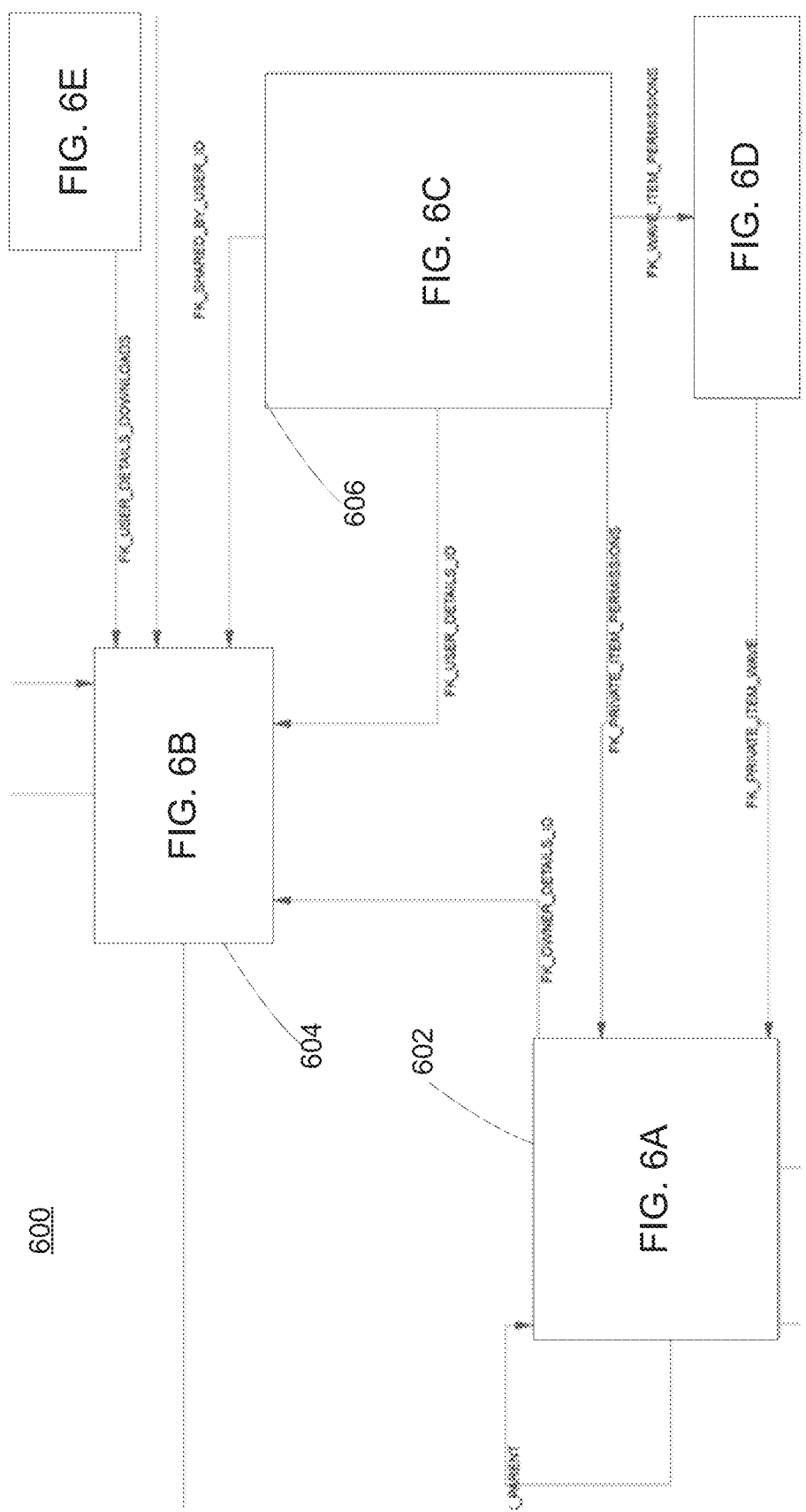
FIG. 6 shows a structure of a database schema according to an example.

The internal access control mechanism and group level sharing are handled via the ACN's database tables as shown in FIG. 6. In particular, FIG. 6 is a database schema for implementation of secured grouped sharing via ACN. FIGS. 6A-E show details of the database schema of FIG. 6.

The following three tables of FIG. 6 store information as follows.

The table "private_items" (FIG. 6A) stores items' related metadata.

The table "tenant_users_details" (FIG. 6B) stores user related metadata including the OEM and ERP IDs as applicable for sharing.

The "permissions" table (FIG. 6C) handles the access control data specifying which access rights (View, Import, Edit, Delete) have been granted.

To ensure access to any tenant of a customer or partner, embodiments evaluate whether the tenant itself (using the tenant ID) or the tenant has a set customer or partner ID to which the analytic content has been shared. Using this approach, when a new tenant is provisioned with the partner and customer IDs, content shared earlier with these partners and customers directly become accessible—with the specified permission level. There is no need for partners, customers or any other user to re-share the content.

According to the solution just described, the SAC platform can ensure trusted and secure transport/sharing of content with its partners and customers, and also provide this option to partners to share content to their customers.

Example 2

Figure 7:
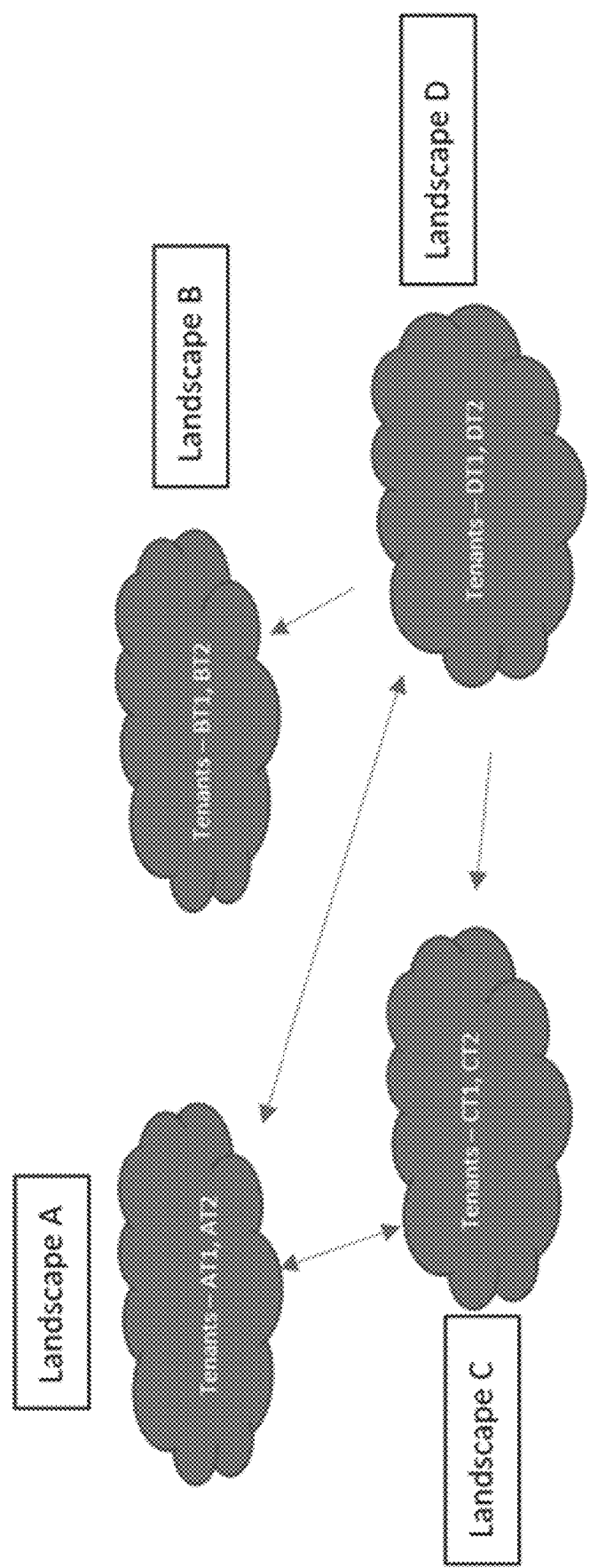
FIG. 7 shows how application tenants could reside within a multi landscape environment.

FIG. 7 shows how application tenants could reside within a multi landscape environment (Landscapes A-D). Consider that the tenant AT1 wants to fetch all the analytical content shared with it across all landscapes.

In order to accomplish this, the tenant AT1 from Landscape A needs to contact all other landscapes in order to get accessible content for AT1. As we can see from the (double-headed) arrows of FIG. 7, AT1 has content available only on Landscapes C and D.

Hence there is no need to query Landscape B. Similarly, for application tenants in Landscape B, no other landscape needs to be queried for content.

Accordingly, embodiments can maintain an optimized list of landscapes in a database for each landscape. This list may be updated and maintained whenever any application tenant shares analytical content in ACN.

For example, a tenant from Landscape A shares content with tenants in Landscapes B and C. Then, the optimized table in B and C will get an entry for Landscape A.

Whenever tenants in Landscape B want to fetch content from ACN, it can refer to the optimized list in the database. This will give Landscape A as a dependent landscape and contact this landscape for content.

In this manner, embodiments allow contacting only dependent landscapes for analytical content, rather than having to contact all landscapes. Moreover, if any landscape has no dependent landscape in the optimized list, that landscape will not need to be query any other landscape for analytical content.

Figure 8:
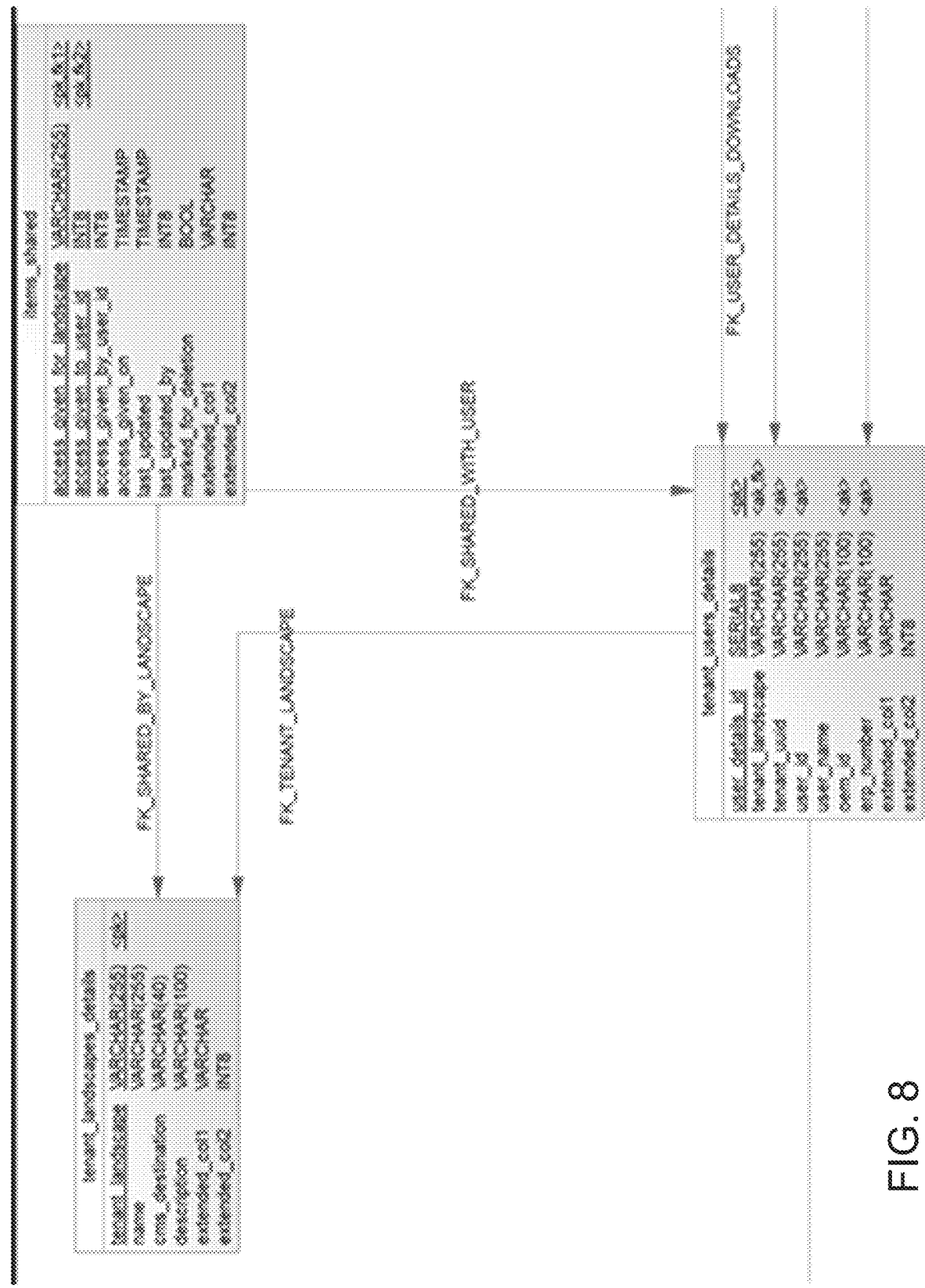
FIG. 8 illustrates an implementation of tenant grouping according to an example.

FIG. 8 illustrates an implementation of this example in ACN. In this FIG. 8, the items_shared relation is the optimized list of landscapes in each landscape. The items_shared relation is mapped to the User for which access has been given.

The optimization table (Items_shared) for the Landscape C in the context of FIG. 7 for this example, is as follows. Assume that application tenants CT1 and CT2 map to user_details_id 1 and 2, respectively.

| access_given_for_landscape | access_given_to_user_id |
|---|---|
| A | 1 |
| A | 2 |

Whenever we want to fetch accessible content for CT1 or CT2 across landscapes, we can refer to this table to know what landscape(s) need to be queried.

A sample scenario for group-based sharing is now described. Assume there are a group of tenants mapped with one OEM ID (e.g., OEM1). Specifically, the tenants AT1, DT1, and CT1 belong to OEMID-OEM1.

Now, some tenant in Landscape C shares content with OEMID-OEM1. Under these circumstances, the optimization table (items_shared) would look like as follows.

Landscape A: Assume that OEM1 maps to user_details_id 1.

| access_given_for_landscape | access_given_to_user_id |
|---|---|
| C | 1 |

Landscape D: Assume that OEM1 maps to user_details_id 1.

| access_given_for_landscape | access_given_to_user_id |
|---|---|
| C | 1 |

Now, if any new tenant from any landscape gets added into the OEMID-OEM1 group, then there might be no entry in items_shared table corresponding to OEM1 and Landscape C. That is, the new tenant might be the first tenant from Landscape C belonging to OEM1 group.

Assume that any application tenant from Landscape B is added to OEM1 group. Since we're making an entry in optimization table (items_shared) only at the time of sharing analytical content, there will be no entry in landscape B's items_shared table which corresponds to OEM1 and landscape C because at the time of sharing, there was no application tenant belonging to OEM1 group.

This issue is addressed in ACN, by running a scheduled job to update the items_shared table. That is, ACN is running a background job every two hours to update items_shared table for newly added tenants in OEM groups. This scheduled job also takes care of removing stale entries from items_shared table.

Below are steps the scheduled job performs every two hours on each landscape:
1) Contact all landscapes to get entries for items_shared table for current landscape.
2) Retrieve current items_shared table entries.
3) Process entries obtained from step 1 and 2 in the following manner:
   a. Remove entries from items_shared table obtained in step 2 but not present in step 2
   b. Add entries to items_shared table present in the list obtained from step 1 but not present in the list obtained from step 2.

Returning now to FIG. 1, there the particular embodiment is depicted with the engine responsible for tenant grouping as being located outside of the database. However, this is not required.

Rather, alternative embodiments could leverage the processing power of an in-memory database engine (e.g., the in-memory database engine of the HANA in-memory database available from SAP SE), in order to perform various functions.

Figure 9:
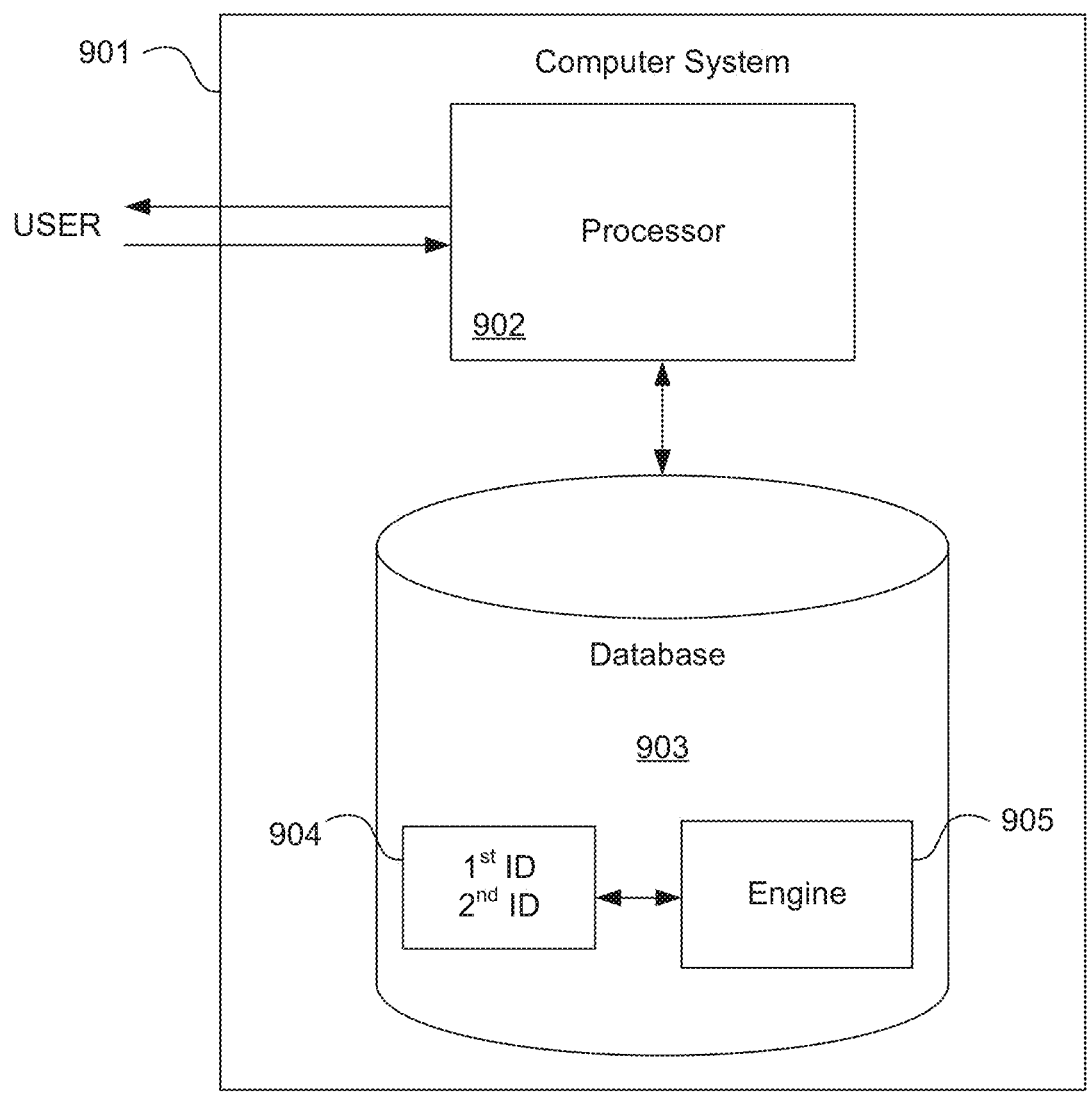
FIG. 9 illustrates hardware of a special purpose computing machine according to an embodiment that is configured to implement tenant grouping.

Thus FIG. 9 illustrates hardware of a special purpose computing machine configured to implement tenant grouping according to an embodiment. In particular, computer system 901 comprises a processor 902 that is in electronic communication with a non-transitory computer-readable storage medium comprising a database 903. This computer-readable storage medium has stored thereon code 905 corresponding to an engine. Code 904 corresponds to a $1^{st}$ identifier and a second identifier. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 10:
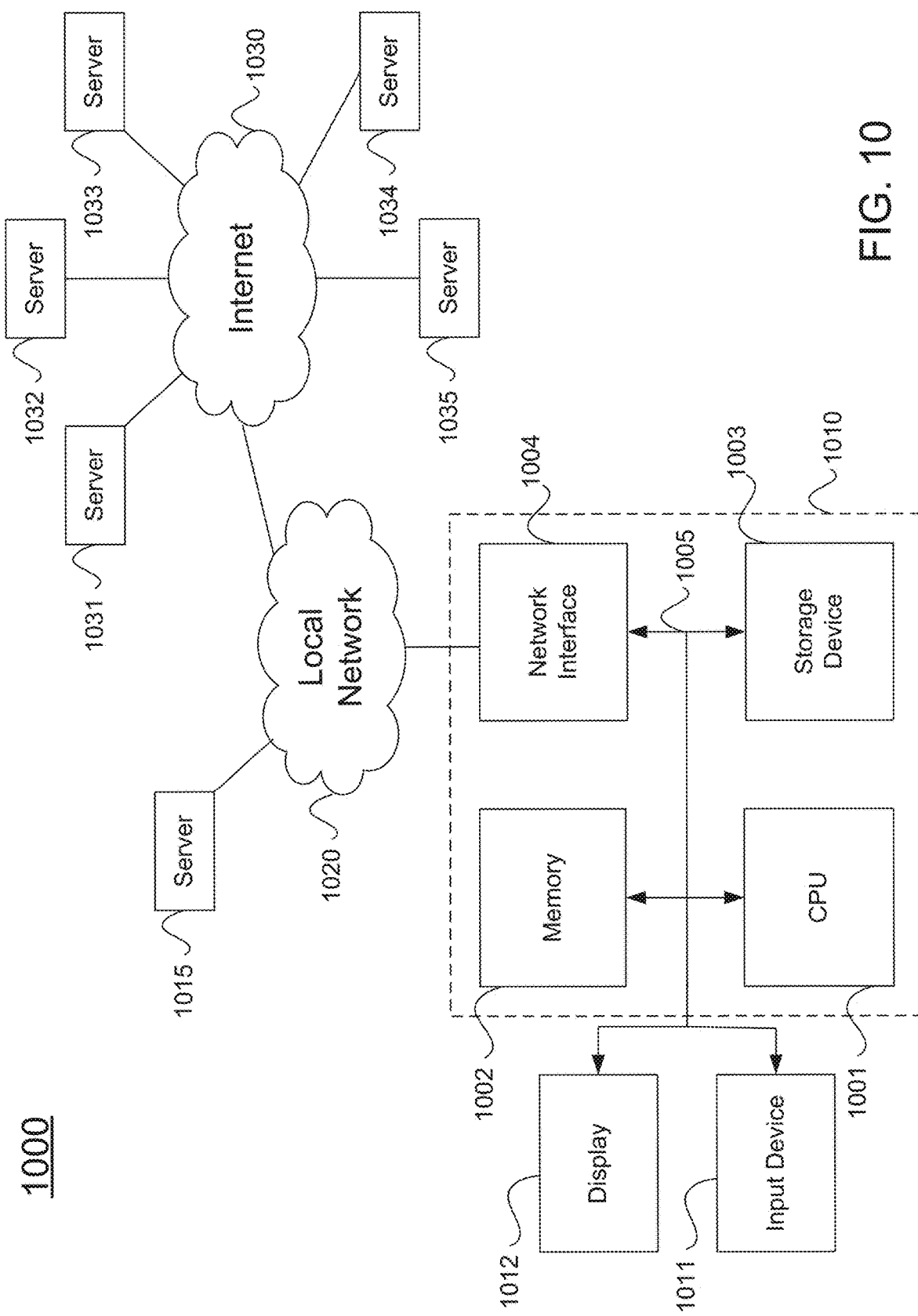
FIG. 10 illustrates an example computer system.

An example computer system 1000 is illustrated in FIG. 10. Computer system 1010 includes a bus 1005 or other communication mechanism for communicating information, and a processor 1001 coupled with bus 1005 for processing information. Computer system 1010 also includes a memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. Storage device and memory are both examples of computer readable mediums.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1004 sends and receives electrical, electromagnetic, or optical signals that carry digital data streams representing various types of information.

Computer system 1010 can send and receive information, including messages or other interface actions, through the network interface 1004 across a local network 1020, an Intranet, or the Internet 1030. For a local network, computer system 1010 may communicate with a plurality of other computer machines, such as server 1015. Accordingly, computer system 1010 and server computer systems represented by server 1015 may form a cloud computing network, which may be programmed with processes described herein. In the Internet example, software components or services may reside on multiple different computer systems 1010 or servers 1031-1035 across the network. The processes described above may be implemented on one or more servers, for example. A server 1031 may transmit actions or messages from one component, through Internet 1030, local network 1020, and network interface 1004 to a component on computer system 1010. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
receiving content created utilizing an application;
receiving a first identifier indicating a customer of the application with which a tenant is associated;
receiving a second identifier indicating a partner of the application with which the tenant is associated;
receiving a third identifier indicating a landscape with which the tenant is associated;
referencing a database table stored in a database to correlate the first identifier, the second identifier, and the third identifier with a tenant user having a fourth identifier; and
evaluating whether the tenant is to be provided access to the content based upon the tenant user.

2. A method as in claim 1 further comprising providing the tenant with the content according to an access right of a level determined from the tenant user.

3. A method as in claim 2 wherein the level of the access right is selected from one of view, import, edit, and delete.

4. A method as in claim 2 wherein:
the tenant is newly associated with the customer; and
the tenant is automatically provided with the content based upon prior distribution of the content to another tenant sharing the first identifier.

5. A method as in claim 4 wherein:
the tenant is located in a first datacenter; and
the other tenant is located in a second datacenter geographically remote from the first data center.

6. A method as in claim 1 further comprising running a regularly scheduled job in the database to provide the first identifier and the second identifier.

7. A method as in claim 6 wherein the regularly scheduled job is further configured to remove stale content from the database.

8. A method as in claim 1 wherein:
the database comprises an in-memory database; and
the evaluating is performed by an in-memory database engine of the in-memory database.

9. A non-transitory computer readable storage medium embodying a computer program for performing a method, said method comprising:
receiving content created utilizing an application;
receiving a first identifier indicating a customer of the application with which a tenant is associated;
receiving a second identifier indicating a partner of the application with which the tenant is associated;
receiving a third identifier indicating a landscape with which the tenant is associated;
referencing a database table stored in a database to correlate the first identifier, the second identifier, and the third identifier with a tenant user having a fourth identifier;
evaluating whether the tenant is to be provided access to the content based upon the tenant user; and
providing the tenant with the content according to an access right of a level determined from the tenant user.

10. A non-transitory computer readable storage medium as in claim 9 wherein the level of the access right is selected from one of view, import, edit, and delete.

11. A non-transitory computer readable storage medium as in claim 9 wherein:
the tenant is newly associated with the customer; and
the tenant is automatically provided with the content based upon prior distribution of the content to another tenant sharing the first identifier.

12. A non-transitory computer readable storage medium as in claim 11 wherein:
the tenant is located in a first datacenter; and
the other tenant is located in a second datacenter geographically remote from the first data center.

13. A non-transitory computer readable storage medium as in claim 11 further comprising running a regularly scheduled job in the database to provide the first identifier and the second identifier.

14. A non-transitory computer readable storage medium as in claim 13 wherein the regularly scheduled job is further configured to remove stale content from the database.

15. A computer system comprising:
one or more processors;
a software program, executable on said computer system, the software program configured to cause an in-memory database engine of an in-memory database to:
receive content created utilizing an application;
receive a first identifier indicating a customer of the application with which a tenant is associated;
receive a second identifier indicating a partner of the application with which the tenant is associated;
receiving a third identifier indicating a landscape with which the tenant is associated;
reference a database table stored in the in-memory database to correlate the first identifier, the second identifier, and the third identifier with a tenant user having a fourth identifier; and evaluate whether the tenant is to be provided access to the content based upon the tenant user.

16. A computer system as in claim 15 wherein the in-memory database engine is further configured to provide the tenant with the content according to an access right of a level determined from the tenant user.

17. A computer system as in claim 16 wherein the level of the access right is selected from view, import, edit, and delete.

18. A computer system as in claim 16 wherein:
   the tenant is newly associated with the customer; and
   the tenant is automatically provided with the content based upon prior distribution of the content to another tenant sharing the first identifier.

19. A computer system as in claim 18 wherein:
   the tenant is located in a first datacenter; and
   the other tenant is located in a second datacenter geographically remote from the first data center.

20. A computer system as in claim 18 wherein the in-memory database engine is further configured to run a scheduled job on the in-memory database to:
   store the first identifier and the second identifier; and
   to remove stale content from the in-memory database.

\* \* \* \* \*